United States Patent [19]

Ducret

[11] Patent Number: 4,870,489
[45] Date of Patent: Sep. 26, 1989

[54] NTSC COMPATIBLE HDTV TRANSMISSION SYSTEM

[76] Inventor: Robert P. Ducret, 630 E. Alvarado St., Pomona, Calif. 91767

[21] Appl. No.: 247,704

[22] Filed: Sep. 22, 1988

Related U.S. Application Data

[63] Continuation-in-part of Ser. No. 78,424, Jul. 23, 1987, abandoned.

[51] Int. Cl.$^4$ .............................................. H04N 7/01
[52] U.S. Cl. .................................... 358/140; 358/160; 358/11
[58] Field of Search .................... 358/140, 11, 12, 160, 358/138, 133; 364/726

[56] References Cited

U.S. PATENT DOCUMENTS

| | | | |
|---|---|---|---|
| 4,227,252 | 10/1980 | Godard | 375/113 |
| 4,432,019 | 2/1984 | Maier | 358/260 |
| 4,504,852 | 3/1985 | Ducret | 358/11 |
| 4,583,190 | 4/1986 | Salb | 364/726 |
| 4,605,962 | 8/1986 | Christopher | 358/140 |
| 4,609,941 | 9/1986 | Carr et al. | 358/140 X |
| 4,694,337 | 9/1987 | Lyons | 358/140 |
| 4,703,349 | 10/1987 | Bernstein | 358/133 |
| 4,713,685 | 12/1987 | Nishimura et al. | 358/140 X |
| 4,729,020 | 3/1988 | Schaphorst et al. | 358/140 |
| 4,736,248 | 4/1988 | Rosebrock | 358/140 |

Primary Examiner—James J. Groody
Assistant Examiner—Victor R. Kostak

[57] ABSTRACT

An HDTV signal is converted to an NTSC bandwidth by analog encoding changing its conventional serial element format to a parallel element format. The picture elements of several HDTV scan lines are combined by fractal scanning and all simultaneously expressed over the time period of one NTSC scan line as individual frequency components within a given spectrum every component maintaining a constant amplitude corresponding to its original modulation level. The procedure is repeated at the NTSC scan line rate. The encoder controls the number of individual frequency components to achieve an HDTV level of information transmission and the frequency spacing between the individual frequency components to effect a bandwidth compression to NTSC levels. A decoder changes the received parallel element format to a serial element format and uses fractal scanning to separate the combined lines for conventional presentation. The parallel element format of the signal is not detectable by the serial element decoding of a conventional NTSC receiver and the fractal scanning is not definable through conventional scanning methods. The HDTV signal encoded by this method is therefore transmitted in the same channel as an existing NTSC transmission and the existing NTSC transmission uses fractal scanning to increase its own informational content to independent HDTV levels while maintaining an NTSC bandwidth.

17 Claims, 7 Drawing Sheets

Fig. 1

Frame $f$ = frequency function $t$ = time function

Four-Fold

| Sector 1 | Sector 2 |
|---|---|
| Sector 3 | Sector 4 |

Sixteen-Fold

| Sub-Sector 1.1 | etc. 1.2 | 2.1 | 2.2 |
|---|---|---|---|
| 1.3 | 1.4 | 2.3 | 2.4 |
| 3.1 | 3.2 | 4.1 | 4.2 |
| 3.3 | 3.4 | 4.3 | 4.4 |

Sixty-four Fold

| 1.1.1 | 1.1.2 | 1.2.1 | 1.2.2 | 2.1.1 | 2.1.2 | 2.2.1 | 2.2.2 |
|---|---|---|---|---|---|---|---|
| 1.1.3 | 1.1.4 | 1.2.3 | 1.2.4 | 2.1.3 | 2.1.4 | 2.2.3 | 2.2.4 |
| 1.3.1 | 1.3.2 | 1.4.1 | 1.4.2 | 2.3.1 | 2.3.2 | 2.4.1 | 2.4.2 |
| 1.3.3 | 1.3.4 | 1.4.3 | 1.4.4 | 2.3.3 | 2.3.4 | 2.4.3 | 2.4.4 |
| 3.1.1 | 3.1.2 | 3.2.1 | 3.2.2 | 4.1.1 | 4.1.2 | 4.2.1 | 4.2.2 |
| 3.1.3 | 3.1.4 | 3.2.3 | 3.2.4 | 4.1.3 | 4.1.4 | 4.2.3 | 4.2.4 |
| 3.3.1 | 3.3.2 | 3.4.1 | 3.4.2 | 4.3.1 | 4.3.2 | 4.4.1 | 4.4.2 |
| 3.3.3 | 3.3.4 | 3.4.3 | 3.4.4 | 4.3.3 | 4.3.4 | 4.4.3 | 4.4.4 |

NTSC COMPATIBLE HDTV TRANSMISSION SYSTEM

NOTICE OF CONTINUATION

The present application is a Continuation in Part of a previous application identified as Ser. No. 078,404 filed on Jul. 23, 1987, now abandoned.

BACKGROUND OF THE INVENTION

1. Field of the invention.

The present invention relates generally to the field of electronic communication and is more particularly directed to a method and apparatus for transmission of high definition television signals over an NTSC type or other present standard type television channel.

2. State of the Prior Art.

The problem of converting a video signal from one television standard to a different one where the two standards differ in the number of scan lines per frame and/or in the field frequency has been addressed by U.S. Pat. No. 4,504,852 issued to Ducret on Mar. 12, 1985. The approach taken is based on the parallel transmission or recording of all the component elements comprising a video scan line. The Ducret reference sought to accomplish this by using a multitude of separate but synchronized oscillators. This led to a rather complex system with a large parts count.

Also known to the applicant are U.S. Pat. No. 4,583,190 issued to Salb on Apr. 15, 1986, U.S. Pat. No. 4,703,349 to Bernstein issued Oct. 27, 1987, U.S. Pat. No. 4,432,019 to Maier issued Feb. 14, 1984, U.S. Pat. No. 4,227,252 to Godard issued Oct. 7, 1980, and U.S. Pat. No. 4,694,337 to Lyons issued Sep. 15, 1987. The Salb reference uses numerical computation techniques to extract mathematical relationships of interest from the input data and then produces a graphical display of these relationships. The Maier and Bernstein references use numerical Fourier Transform techniques to reduce the amount of numerical data required to adequately represent an image. The Godard reference uses numerical Hilbert Transform techniques to extract a phase synchronization signal for a synchronous data receiver. The Lyons reference uses numerical interpolation techniques to reduce the amount of numerical data required to represent a first and greater number of video scan lines, to a lesser amount of numerical data required to represent a second and lesser number of video scan lines. All of these references employ digital numerical representations of the signal of interest and perform mathematical computations to extract the numerical results required, using at some point in the computations the powerful techniques of the Fourier Transform or a variation thereof. The Maier, Bernstein, and Lyons references accomplish what is generally known as Data Compression: a reduction in the amount of data required to adequately represent a signal.

The present invention does not use a numerically computed Fourier Transform. Rather, it utilizes dispersive delay lines, local oscillators, and mixers, all of them in the class of analog devices, to effect a 90 degree axes rotation of the instantaneous temporal and cyclical frequency components of a signal as represented by electromagnetic phenomenona of real time. It can be said that in reference to the subject signal this invention gives time the qualities of frequency and gives frequency the qualities of time. Also, the present invention does not perform what was defined above as data compression. Rather, it conserves all of the informational data of the input signal and performs a Signal Compression: a reduction in the signal bandwidth required to contain all of the sidebands of the signal by reducing the frequency spacing between the sidebands.

SUMMARY OF THE INVENTION

The present invention overcomes the problems of the prior art of the Ducret reference by replacing the multitude of addressed oscillators producing the parallel transmission with a small set of dispersive delay lines and sweeping local oscillators. These components are presently available from producers of surface acoustic wave products and similar sources. All of the features of the prior art such as choice of number of scan lines upon presentation and panning of the received format are preserved in this modification. Furthermore, other features, not evident in the prior art, become possible using the present invention. These features include, but are not limited to, new features relating to scanning formats, reduction of transmission bandwidth, utilization of the same channel by two different transmission formats, signal compression within a parallel transmission and further signal compression and concealment within a compatible simultaneous standard transmission. The encoded parallel signal of this system may be decoded upon reception, playback or further processing by a similar set of dispersive delay lines and sweeping local oscillators.

DETAILED DESCRIPTION OF A PREFERRED EMBODIMENT OF THE INVENTION

Figure 1:
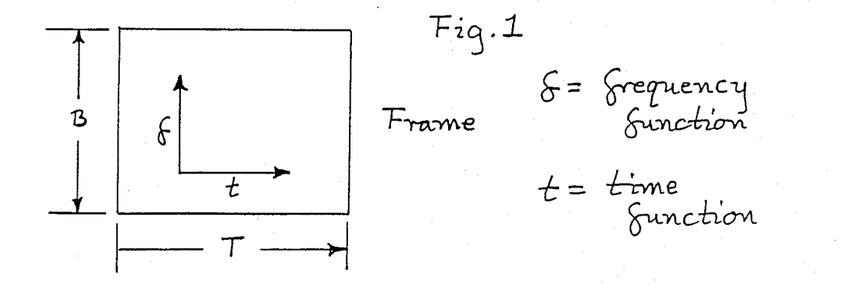
FIG. 1 illustrates and defines a "frame"
Figure 1A:
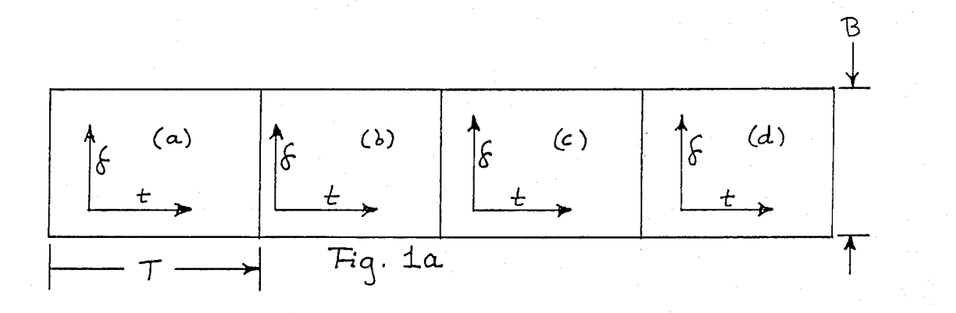
FIG. 1a shows a standard wideband signal defined as a series of frames.

With reference to the drawings, FIG. 1 is a diagram of a signal analysed over a time period T in which the instantaneous amplitude of any frequency function (f) within the signal bandwidth B varies as a function of the time (t). This type of diagram may be called a "frame" and is applicable to any type of signal although it lends itself most readily to a television signal. As shown in FIG. 1a, any signal occupying a band of frequencies and extended over some period of time may be thought of as a series of frames.

Figure 3:
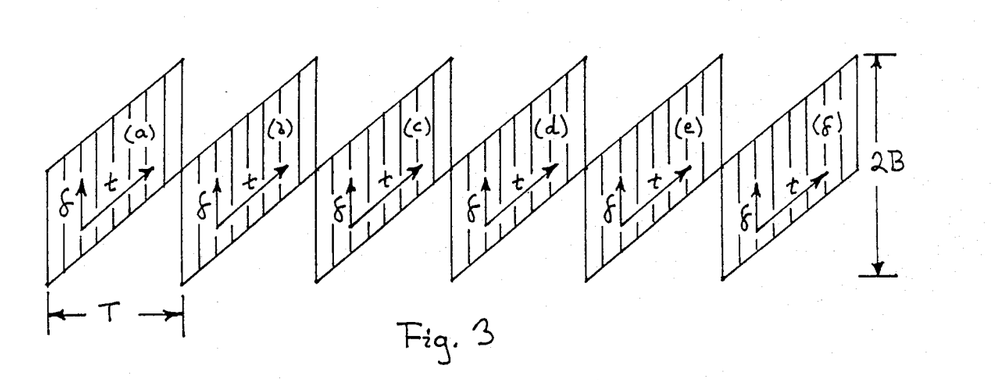
FIG. 3 is a diagram which shows an output of Mixer 3.
Figure 3A:
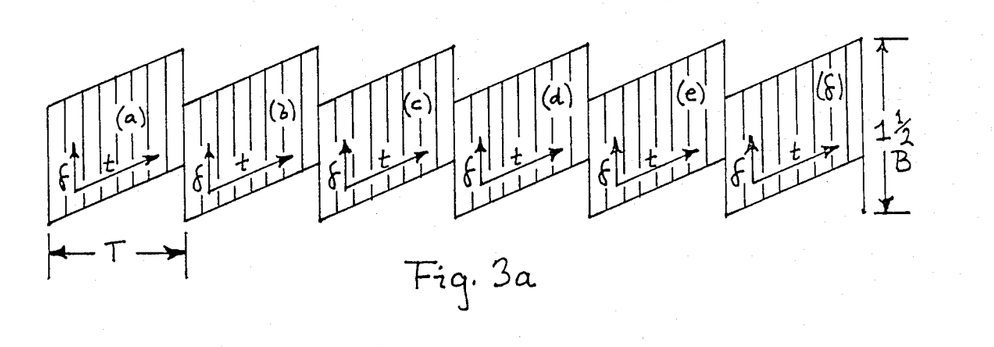
FIG. 3a is a diagram which shows a first alternate output of Mixer 3.
Figure 3B:
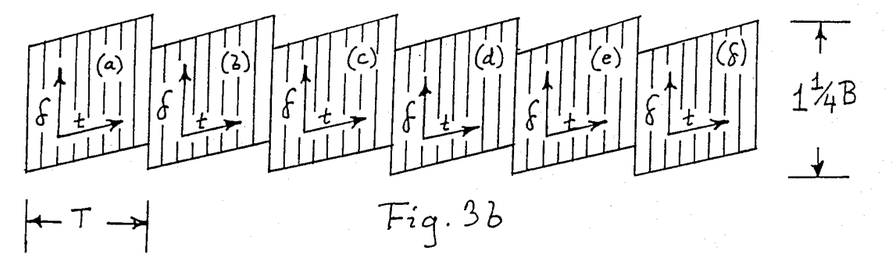
FIG. 3b is a diagram which shows a second alternate output of Mixer 3.
Figure 4:
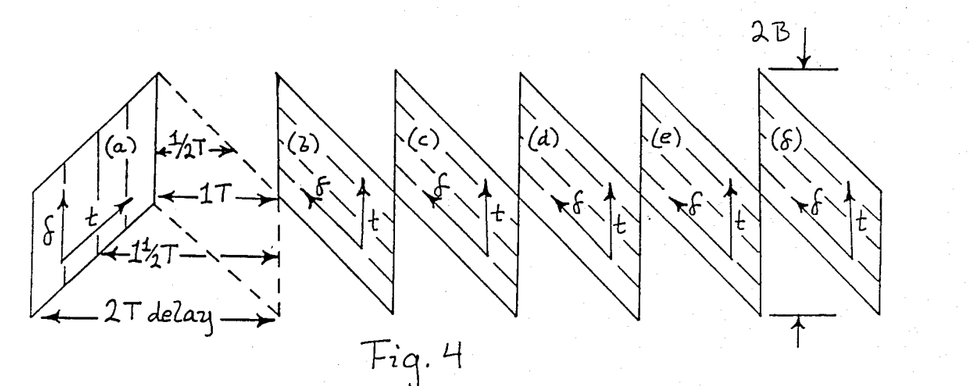
FIG. 4 is a diagram which shows an output of Dispersive Delay Line 4.
Figure 4A:
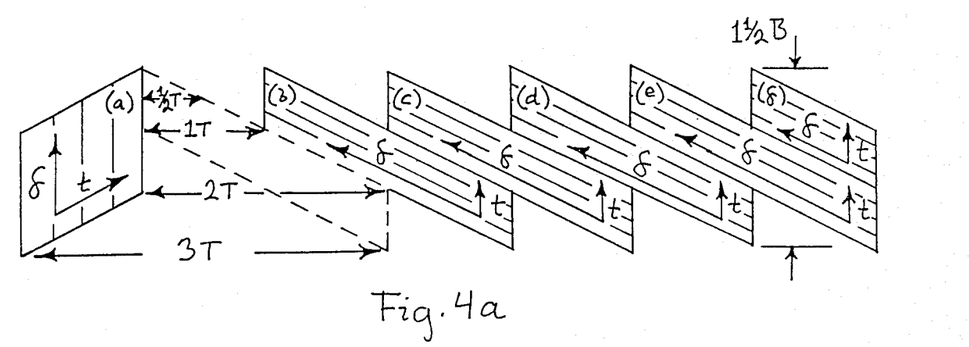
FIG. 4a is a diagram which shows a first alternate output of Dispersive Delay Line 4.
Figure 4B:
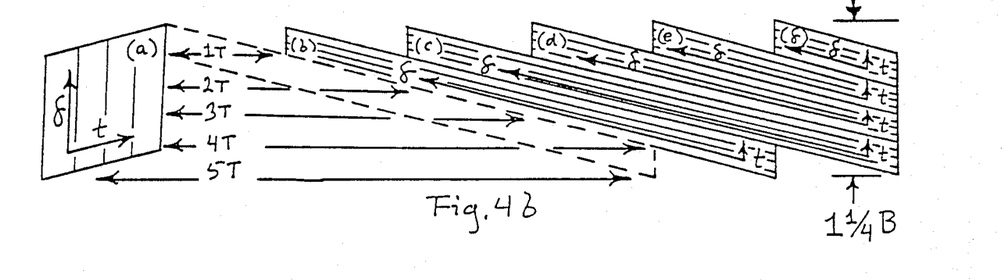
FIG. 4b is a diagram which shows a second alternate output of Dispersive Delay Line 4.
Figure 5:
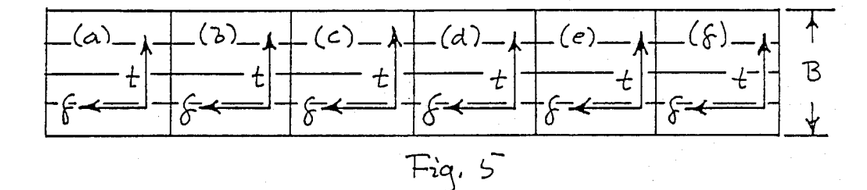
FIG. 5 is a diagram which shows an output of Mixer 5.
Figure 5A:
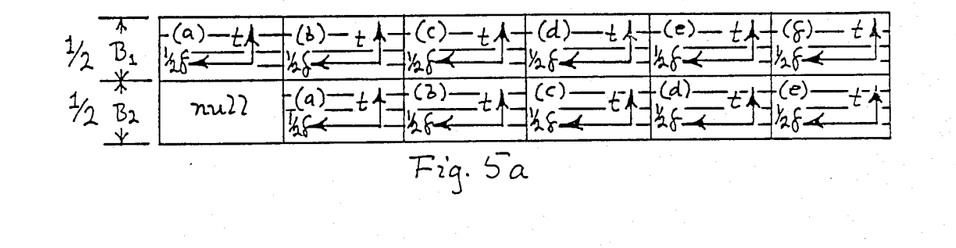
FIG. 5a is a diagram which shows a first alternate output of Mixer 5.
Figure 5B:
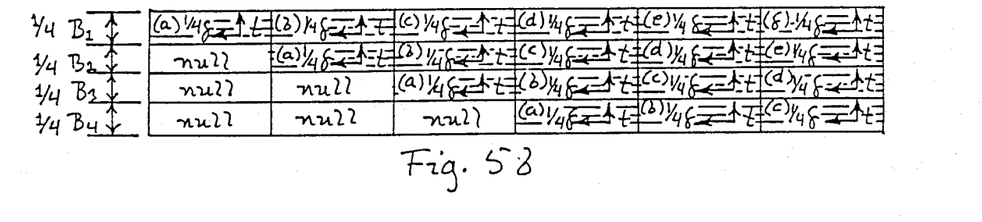
FIG. 5b is a diagram which shows a second alternate output of Mixer 5.

The operation of this invention will first be illustrated with respect to television signals by showing a transformation from a serial element signal (present television standard broadcast) to a parallel element signal (proposed system) with no signal compression imposed on the signal. FIGS. 1, 1a, 3, 3a, and 3b show serial element signals; FIGS. 4, 4a, and 4b show rotations from serial to parallel signals; and FIGS. 5, 5a, and 5b show parallel element signals. Time and frequency are represented in these drawings but not amplitude. Amplitude may be envisioned within the signal representation of these drawings as a vector extending perpendicularly outward from the surface of the drawing said vector having a length appropriate to its point of origin.

Figure 7:
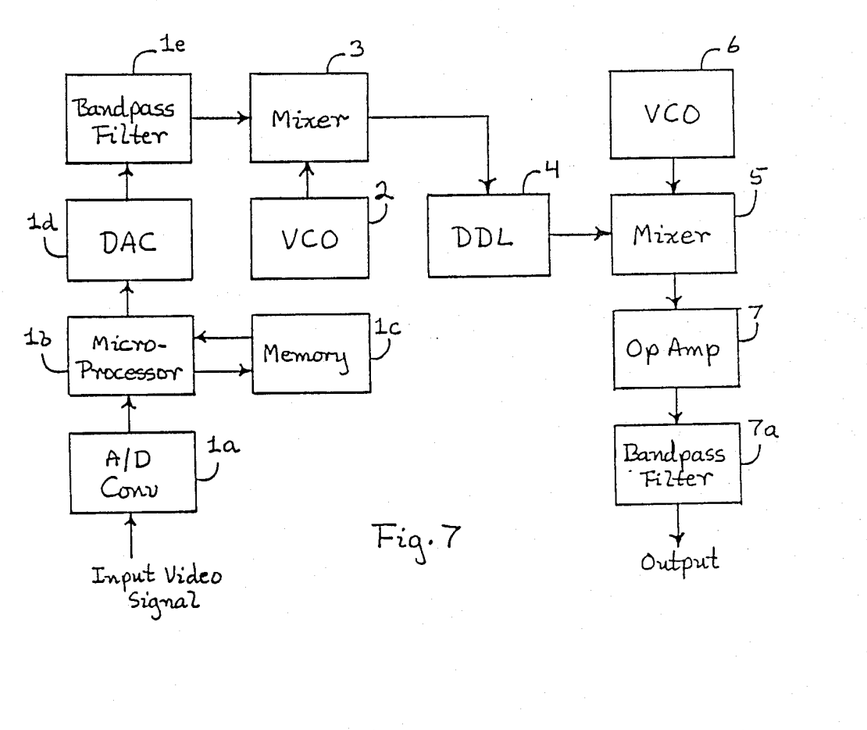
FIG. 7 is a block diagram of a Typical Encoder according to the invention.

According to the method of this invention and in reference to FIG. 7 the input video signal (from FIG. 1a) is first converted into a digital format by the A/D Converter 1a and sent to Microprocessor 1b. In the no signal compression mode Microprocessor 1b routes the digital signal to Memory 1c and directs the memory to temporarily store it on a first in first out (FIFO) basis. Microprocessor 1b now uses a parallel operation and a clock rate significantly faster than the element rate of the original input signal to read out the digital information from Memory 1c as intermittent information signals of very short duration with relatively long blank periods between each signal and sends these information signals to DAC 1d to produce a sampling format of precisely timed, very short duration analog pulses. An idealized representation of this sampling format is shown in the drawings as vertical lines within each serial frame and horizontal lines within each parallel frame. These lines define regions of equal amplitude within the drawings. The vertical lines represent the output of DAC 1d in response to the digital signals from the A/D Converter 1a: an evenly spaced temporal series of extremely short duration pulses within each frame each pulse having its own appropriate amplitude and each representing an individual element. The output of DAC 1d is then sent through Bandpass Filter 1e to remove any signals unneccessary to further processing.

Figure 2:
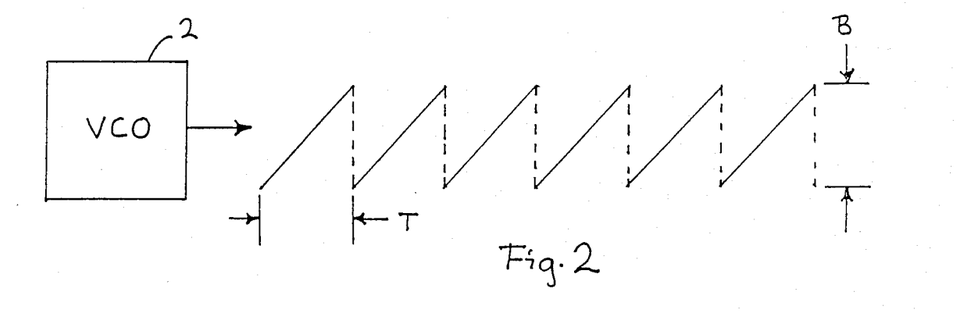
FIG. 2 is an idealized diagram in which a Voltage Controlled Oscillator (VCO) 2 outputs a swept frequency waveform of frequency excursion B and period T.

A sweep frequency oscillator (VCO 2) is made to produce a sawtooth swept FM output waveform as shown in FIG. 2 with a defined period T and a frequency excursion determined by the desired output bandwidth of the Encoder and shown here for a full bandwidth example as B. The desired sawtooth FM waveform is fed to Mixer 3 of FIG. 7 along with the input signal from Bandpass Filter 1e and thereby determines the period T of a series of frames such as shown in FIG. 3. The output of the Mixer 3, as shown in FIG. 3 is fed to the Dispersive Delay Line 4 effecting a maximum relative delay time equal to twice the period T of the frame series of FIG. 3 (or 2T) over a frequency excursion of twice the bandwidth of FIG. 1a (or 2B) as shown in FIG. 4. As can be seen from this figure an axes rotation results thereby defining the original frequency functions of FIG. 3 by time components and time functions of FIG. 3 by frequency components. The rotated signal is now heterodyned in Mixer 5 with a sweep frequency waveform from VCO 6 similar to the waveform shown in FIG. 2. This results in a complete axes transformation as shown in FIG. 5. The horizontal lines of FIG. 5 represent the result of the rotation of each frame in response to the manipulations of VCO 2, Mixer 3, DDL 4, VCO 6, and Mixer 5: an evenly spaced frequency series of extended duration single frequency components within each frame each frequency with its own appropriate amplitude and each representing an individual element. Thus the importantance of the two mutually reciprocal components of FIG. 7, DAC 1d and Converter 1a lies in ultimately determining the precision of the frequency spacing of the parallel element signal components. The signal is now identical to that obtained by the prior art of the Ducret reference except that the amplitude of the signal is not yet guaranteed to be held constant over a frame period.

To make the signal of FIG. 5 have a constant amplitude over each frame period, two things must be done. First, the characteristics of the input should be standarized as a series of pulses each with predictable energy distribution ((sin x)/x) over its frequency spectrum and each differing from any other only in amplitude. This was already done by the A/D Converter 1a in combination with the DAC 1d as shown in FIG. 7. Second, the output must be put through Op Amp 7 with a time varying gain that attenuates the more intense components and/or amplifies the less intense ones. Since these components of the signal are now separated in time rather than frequency this becomes a straightforward matter for an op amp. Now the output of Op Amp 7 is sent through Bandpass Filter 7a to remove any signals outside of the desired transmission bandwidth. After this final manipulation the signal is identical to that shown by the Ducret reference.

The present invention can also perform a signal compression or expansion. The compression mode will now be examined as a sufficient example of the technique required by either mode.

Figure 2A:
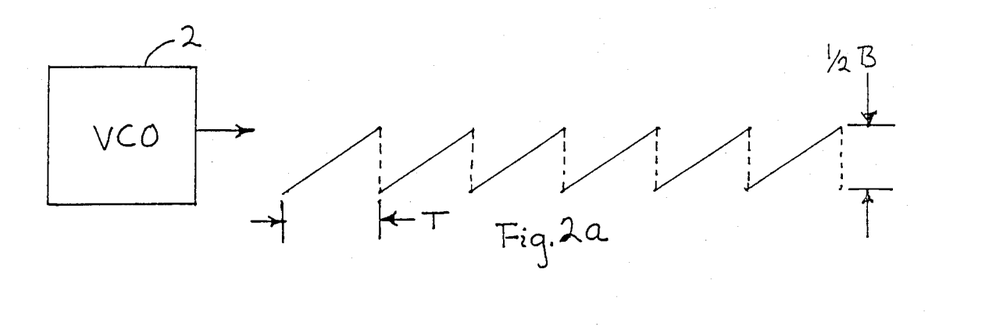
FIG. 2a is an idealized diagram in which a Voltage Controlled Oscillator (VCO) 2 outputs a swept frequency waveform of frequency excursion ½ B and period T.
Figure 2B:
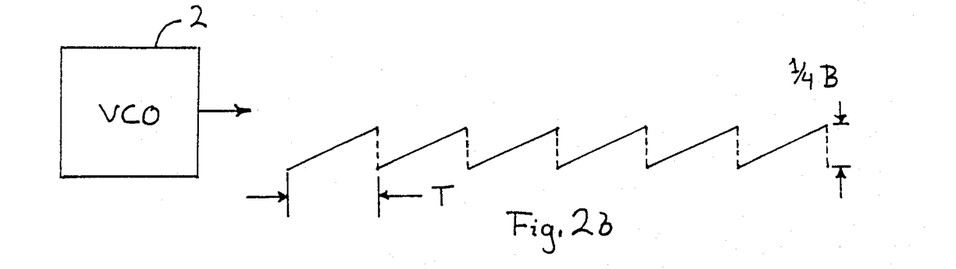
FIG. 2b is an idealized diagram in which a Voltage Controlled Oscillator (VCO) 2 outputs a swept frequency waveform of frequency excursion ¼ B and period T.

In reference to FIG. 7, the sweep frequency oscillator (VCO 2) is made to produce a saw tooth FM output waveform with a defined period T and a frequency excursion ½ B such as is shown in FIG. 2a. This waveform is fed to Mixer 3 along with the input signal from Bandpass Filter 1e. The output of Mixer 3, as shown in FIG. 3a is fed to the Dispersive Delay Line 4 effecting a maximum relative delay time equal to three times the period T of the frame series of FIG. 3a (or 3T) over a frequency excursion of one and one half times the bandwidth of FIG. 1a (or 1 ½ B) as shown in FIG. 4a. As can be seen from this drawing an axes rotation results. The rotated signal is now heterodyned in Mixer 5 with a sweep frequency waveform from VCO 6 similar to the waveform shown in FIG. 2a. This results in a complete axes transformation as shown in FIG. 5a. The output of Mixer 5 is now sent through Op Amp 7 to produce a signal of constant amplitude over each frame period, and then through Bandpass Filter 7a to remove any signals outside of the desired transmission bandwidth.

An examination of FIG. 4a reveals a process in which the original time axis of the frame is compressed by a factor of two while the original frequency axis is reciprocally expanded. Note that the number of frequency components in the parallel element signal (determined by A/D Converter 1a and DAC 1d of FIG. 7) has remained constant while the spacing between components has been halved. FIG. 4b reveals the same process with a factor of four. These two examples, along with a thoughtful consideration of FIGS. 2a and 2b, and FIGS. 3a and 3b, reveal a method in which the proper coordination of the characteristics of VCO 2, Mixer 3, and DDL 4 of FIG. 7 can effect any expansion or compression of either the time or the frequency axis of the frame of FIG. 1a.

An examination of the first alternate output of Mixer 5 as shown in FIG. 5a reveals a process in which the input frequency band B of FIG. 1a has been split into two bands B1 and B2 with B2 delayed by one period T relative to B1. These bands are each ½ B in bandwidth. They each contain all of the time varying components (t) of the original signal now seen as distinct frequency components but they each contain only half of the original frequency components (f) now seen as constant amplitude time components. Since the present invention is meant to produce a signal of constant amplitude over a frame period, the two bands are identical to each other except for their placement in the frequency spectrum, a one period delay of one band relative to the other, and different phase relationships between the component frequencies comprising each band. An examination of the second alternate output of Mixer 5 shown in FIG. 5b reveals the same process of "signal compression" as shown above with a reduction to ¼ B. These two examples point to a method by which any reduction in the signal bandwidth can be effected by the process we have now defined as Signal Compression. It will be shown that the transmission or recording of only one of these bands is sufficient for complete reconstruction of the signal upon reception or playback. The other bands may be rejected by Bandpass Filter 7a as being outside of the desired signal bandwidth and may be completely ignored in the implementation of the proposed system. Careful consideration of FIGS. 3 through 4b, moreover, shows that DDL 4 of FIG. 7 can handle any level of signal compression with a maximum relative delay of two times the frame period (2T) over a bandwidth of two times the desired output transmission bandwidth (2b). It is obvious that the greater the bandwidth needs of the higher definition systems the greater the extent of the signal compression that must be imposed on the signal to contain it within a single channel transmission: doubling only the number of scan lines would double the standard bandwidth needs and would thus require a compression to ½ band; doubling both the number of scan lines and the horizontal definition would quadruple the standard bandwidth needs and would thus require a compression to ¼ band; quadrupling both the number of scan lines and the horizontal definition would require a compression to 1/16th band and so forth.

Figure 6:
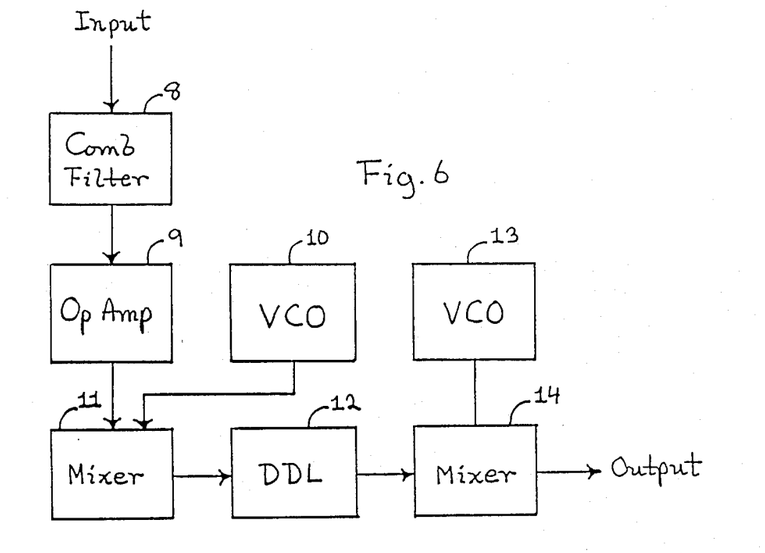
FIG. 6 is a block diagram of a Typical Decoder according to the invention.
Figure 10:
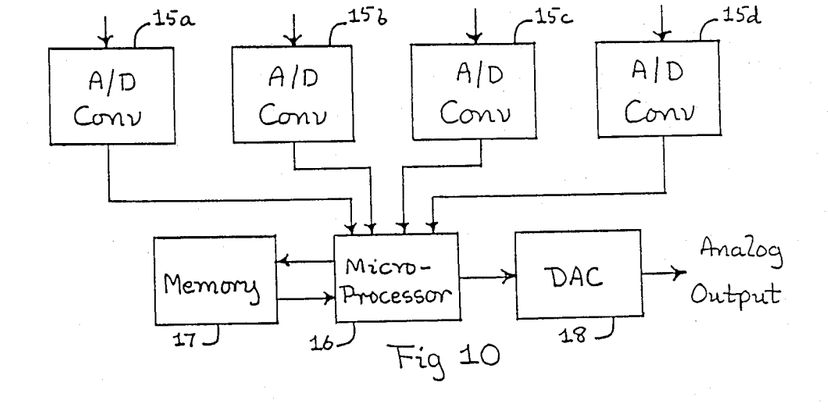
FIG. 10 is a block diagram of the Line Processor.

The transformation of the received or played-back parallel signal into a standard serial signal by the Decoder of FIG. 6 is accomplished by using the same methods as have already been described for the serial to parallel transformations of the Encoder of FIG. 7. Both types of transformations are axes rotations performed by a suitable set of VCOs, Mixers and DDLs (VCOs 10 and 13, Mixers 11 and 14, and DDL 12 of FIG. 6 for the Decoder). A bandwidth reduced parallel signal, however, will be rotated into a bandwidth reduced serial signal and it will not be possible to resolve all the elements of the original signal because of the reduced bandwidth. To remedy this, Comb Filter 8 is used in the Decoder circuit (FIG. 6) ahead of any axes rotation functions. A single comb filter will pass all the frequency components of a full band transmission, ½ the frequency components of ½ band transmissions, ¼ the frequency components of ¼ band transmissions and so forth. Obviously a doubled definition receiver requires two decoders, a quadrupled definition receiver requires four decoders and so forth. Op Amp 9, used in the Decoder circuit of FIG. 6 after Comb Filter 8 puts the proper time function shape (some portion of a (sinx)/x function) into the frequency components before rotation. After rotation the time function will become a frequency response function. The axes rotation involved in the encoding process may be clockwise or counterclockwise as long as it is a 90 degree rotation. The decoding process may then use a 90 degree rotation of the same or opposite direction. A same direction rotation will produce a decoded signal whose time and frequency axes are pointed opposite to those of the original signal, and an opposite direction rotation will produce a decoded signal whose time and frequency axes are pointed in the same direction as those of the original signal. Either choice leads to a viable system but we will choose the opposite direction rotation for the systems of this disclosure. If the period T(d) of the Decoder's VCOs is different from the period T(e) of the Encoder's VCOs a relative difference in the number of scan lines will result. This effect is the same as that of the Ducret reference. It should be noted here that "beating" artifacts from a difference in the number of scan lines do not occur through this method because each element along a combined scan line is the resultant of a graded proportion of its constituent elements. After decoding the signal is treated as an ordinary serial signal of some standard format. If signal compression has been used on the signal, the output of each decoder must be routed to the Line Processor circuit of FIG. 10 to be combined with the outputs of the other decoders of the system into the proper scanning format.

The frequency components of the parallel element transmission are each one representative of a single element along a single scan line. Whereas a single element in a serial (standard television) transmission may produce a sharp and distinct response in existing television receivers because of its rapidly changing characteristics, a single element of a parallel element transmission will produce very little response in such receivers because it will not change its characteristics during a scan line period and it contains only a small fraction of the energy of the entire signal. Moreover, the instantaneous resultant of all the frequency components of the parallel element transmission will present very little energy to an existing receiver because it can be shown that the components are not in phase with each other except at the beginning and end of each frame period. These in-phase instants will occur during the line blanking periods of existing receivers. Conversely, the NTSC serial transmission presents very little signal to the parallel transmission because the rotations performed by the Decoder make the serial transmission look like a parallel transmission to the final output. This means that as long as the frame period of the parallel element transmission and the line period of the NTSC serial transmission are synchronized properly both signals can be sent independently of each other and be mutually invisible or orthogonal.

The foregoing comment that the serial transmission looks like a parallel transmission during part of the operation of the proposed system implies that the said system can be modified to transmit extra information in an otherwise standard NTSC transmission or in the NTSC portion of the orthogonal signal. In reference to FIG. 7 this variation is actually the same system with the point of transmission placed between Bandpass Filter 1e and Mixer 3 instead of at the output of Bandpass Filter 7a. The wide bandwidth output of DAC 1d in response to the high information rate digital signals from Microprocessor 1b is merely limited to a band of normal width by Bandpass Filter 1e and transmitted as an ordinary NTSC signal. Upon reception the NTSC signal is processed by a version of the Encoder system of FIG. 7 from VCO 2 to Bandpass Filter 7a in combination with the Decoder system of FIG. 6. It is first rotated to a parallel element format and then processed by the same techniques as any other parallel element format to extract the original high information rate signal. The line scanning formats to be described below or variations of the same can be used with this signal compressed NTSC signal because their fractal nature causes a merging of element information into the lower NTSC resolution level as lower resolutions of the signal are attained.

Figure 8:
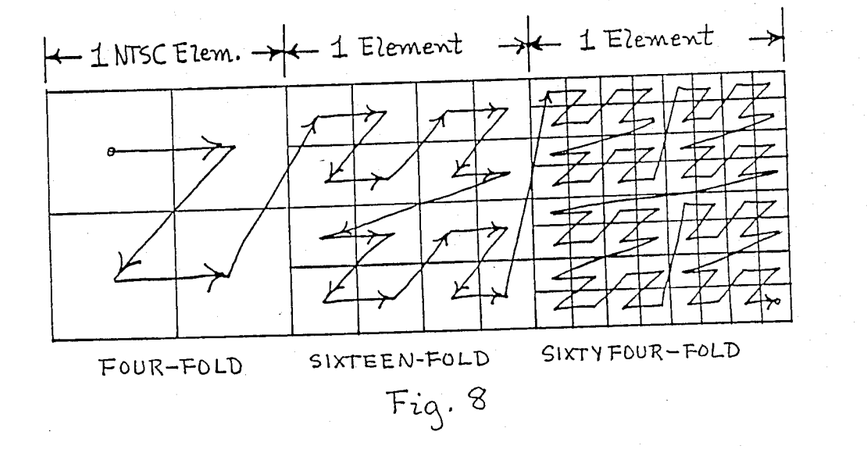
FIG. 8 is a diagram of a scanning format.
Figure 9:
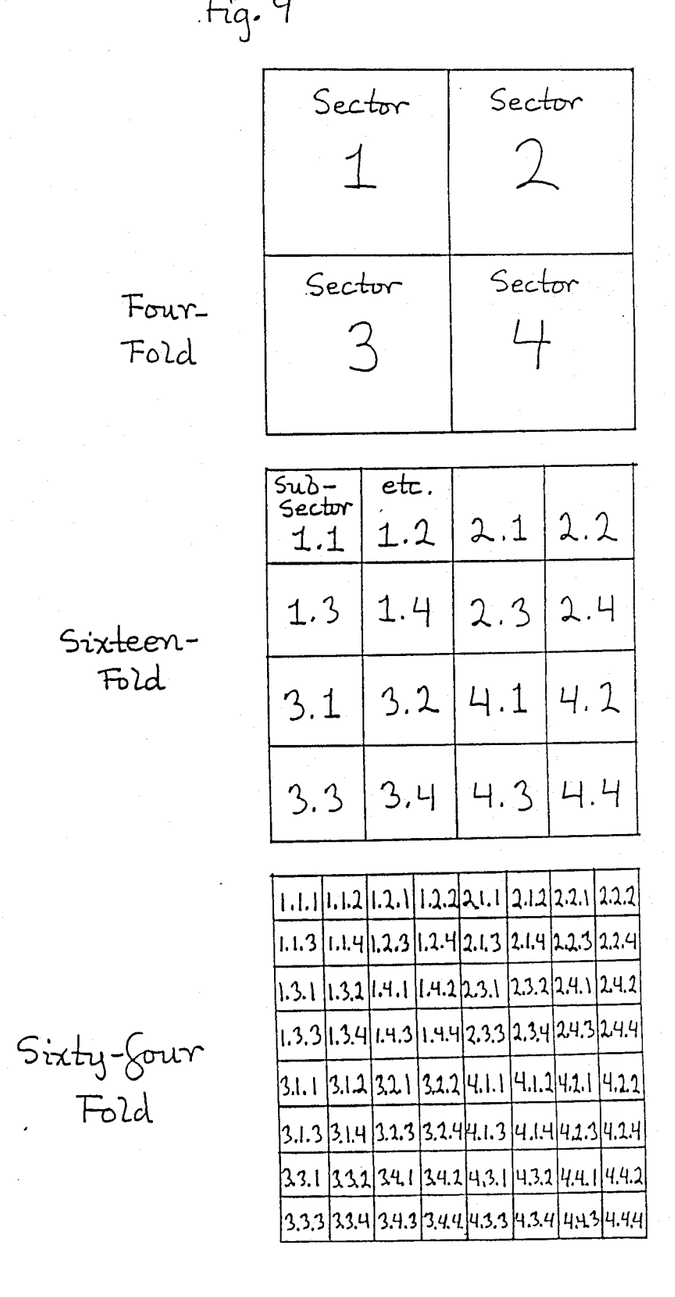
FIG. 9 is a table of scanning format assignments.

A scanning format is here presented as an example of how to fully utilize the potential of this compatible HDTV/NTSC transmission system. Because of NTSC scan line restrictions on a compatible system only 15,734.26 parallel element (HDTV) frames corresponding to 15,734.26 serial element (NTSC) scan lines are assigned for transmission each second. But because of the concealed nature of the parallel element transmission there are no restrictions on the number of complete pictures transmitted per second. Therefore a 24 picture per second system corresponding to the motion picture standard will be presented merely as an example. In this system 655.59 scan lines are assigned to each picture and we will choose to make 625 of these active. This means that for a 1250 scan line picture two lines of elements, each containing twice as many elements as a standard line, must be folded four into one per parallel element frame, and for a 2500 line picture four lines of elements, each containing four times as many elements, must be folded sixteen into one per parallel element frame and so on. The folding format to achieve this is shown in FIG. 8 and element assignments are shown in FIG. 9.

With reference to FIG. 7 Memory 1c is used during band reduction transmissions to store scanning line elements in memory locations called "Sectors" under the control of Microprocessor 1b. As an example of the method, for a 1250 line picture transmission, Microprocessor 1b receives lines of elements in digital form from A/D Converter 1a and assigns all odd numbered elements from the first line to a Memory 1c location designated "Sector 1". All even numbered elements from the first line are assigned to "Sector 2", all odd numbered elements from the second line are assigned to "Sector 3", and all even numbered elements from the second line are assigned to "Sector 4". After two complete scan lines of elements have been assigned to Sectors 1, 2, 3, and 4 the element assignment will continue in the same manner using alternate Memory 1c locations designated as Sectors 5, 6, 7, and 8. After two more lines of elements are completed the assignment process returns to Sectors 1, 2, 3, and 4 and the cycle begins anew.

As Sectors 5, 6, 7 and 8 are being assigned, Sectors 1, 2, 3, and 4 are being read out on a first in first out (FIFO) basis. That is, the first memory location of each Sector to have received an input is read out and cleared in order of: Sector 1, Sector 2, Sector 3, and Sector 4. Then the second memory location of each Sector to have received an input is read out and cleared in the same manner, then the third, then the fourth, and so forth. When Sectors 1, 2, 3, and 4 have been completely read out and cleared the process will continue on into Sectors 5, 6, 7, and 8 while Sectors 1, 2, 3, and 4 are being written into. As this steady stream of digital element information is being read out of Memory 1c by Microprocessor 1b it is being routed in an evenly timed manner by the same microprocessor to DAC 1d from where it will receive further processing as previously described.

The extremely high information rate of the output of Microprocessor 1b means a rapid response and a wideband output are required of DAC 1d. For the 1250 line format that we have been examining the bandwidth of the signal leaving DAC 1d will be at least four times as broad as a standard bandwidth. With a signal compression to ¼ band however, the signal leaving the system will have a standard bandwidth and will moreover be concealed within an NTSC transmission.

Receivers for the 1250 line format may be equipped with four decoders which may be designated Decoder 1, Decoder 2, Decoder 3, and Decoder 4 in accord with the Encoder's Memory 1c element assignments of Sector 1, Sector 2, Sector 3, and Sector 4. In fact any single decoder will receive element information from only one sector and no other, so the output of each decoder such as the one of FIG. 6 contains analog serial element information from its assigned sector only. This information is sent by each decoder in the system to its respective A/D Converter 15a through 15d as shown in the Line Converter block diagram of FIG. 10. Microprocessor 16 receives digital element information from each A/D Converter and directs Memory 17 to store it in memory locations designated as Sector 1 for input from A/D Converter 15a, Sector 2 for 15b, Sector 3 for 15c, and Sector 4 for 15d. After one complete input line is stored alternate memory locations are used for the next input line and after that line is stored memory locations revert back to the original ones and the cycle repeats. Alternate memory locations are designated as Sector 5 for 15a, Sector 6 for 15b, Sector 7 for 15c, and Sector 8 for 15d. The first output scan line is reconstructed by Microprocessor 16 by reading out information from the Sector 1 and Sector 2 locations of Memory 17 on a first in first out (FIFO) basis as previously described. Sector 1 provides element information for line segments 1, 3, 5, etc. and Sector 2 provides element information for line segments 2, 4, 6, etc. The second scan line is reconstructed by Microprocessor 16 in the same manner from information from Memory 17 locations Sector 3 and Sector 4. After the last out memory locations of sectors 1 to 4 are read out and cleared, new information is stored in the first in locations of these sectors. The third scan line is then reconstructed from information from Sector 5 and Sector 6 and the fourth scan line from Sector 7 and Sector 8. After this the cycle repeats and the fifth scan line is reconstructed by Microprocessor 16 from new information in Sector 1 and Sector 2. As these output scan lines are reconstructed in digital form into the desired scanning format (24 pictures per second of 1250 lines each in this example) they may either be sent to DAC 18 to be converted back to an analog output and presented to an analog HDTV monitor or left in digital form for use by a digital HDTV monitor which may be capable of digitally storing each complete picture as it is received and reading it out three times in succession to produce a 72 picture per second noninterlaced display.

The system considered above is a fourfold system. Other systems are possible and a sixteenfold system will now be discussed. Just as the fourfold system stored two input lines and then processed them out as one fourfolded line, the sixteenfold system would store four input lines and process them out as one sixteenfolded line. It can be seen that the fourfold system puts the digital information of four elements into the "space" of one by assigning four sectors to one element. A sixteenfold system would carry this process one step further assigning four "subsectors" to each sector using the same upper-left-to-upper-right-to-lower-left-to-lower-right pattern. The subsectors would be designated 1.1 through 1.4;2.1 through 2.4;3.1 through 3.4; and 4.1 through 4.4. This pattern would continue through alternate subsectors 5.1 through 8.4. The previous assignment of Sector 1, for instance, may be seen as containing the element information of four elements designated Subsectors 1.1 through 1.4 just as a single element location of a parallel element frame may be seen to contain the element information of four elements designated Sectors 1 through 4. The receiver for this sixteenfold system would of course contain sixteen decoders appropriately designated 1.1 through 1.4, 2.1 through 2.4, and so forth to 4.4, and sixteen A/D Converters to feed the microprocessor. The operation of this receiver would be analogous to that of the fourfold receiver but with sixteen memory subsectors and four output lines to each input line. A sixtyfourfold system would use sixtyfour subsectors, decoders, and A/D converters with these designated 1.1.1 through 1.1.4, 1.2.1 through 1.2.4, 1.3.1 through 1.3.4, 1.4.1 through 1.4.4, 2.1.1 through 2.1.4, and so forth to 4.4.4. It can be seen that the assignment of sectors and subsectors follows what is known mathematically as a fractal pattern.

The preferred HDTV/NTSC system envisioned in this patent is a fourfold system with a wide screen aspect ratio achieved by varying the horizontal scanning time function of the camera as required. Therefore any aspect ratio may be used. This fourfold system presents approximately 1250 lines for a 24 picture per second format as herein proposed or approximately 1000 lines for a 30 picture per second format. It is compatible with existing NTSC receivers in as much as a standard NTSC format or a bandwidth reduced fractal scanned NTSC format may utilize the same frequency band to transmit the same program along with independent image modifications such as panning if desired, or the NTSC format may be utilized to transmit a partially or totally different program. It will remain compatible with further improved systems of the same generic type and they will remain compatible with it. Sixteenfold systems would present either 2500 or 2000 lines, sixtyfourfold systems would present either 5000 or 4000 lines, and so forth. Other-fold systems are possible based on but not limited to triangular, rectangular, parallelogram, or square patterns including but not limited to twofold, threefold, ninefold, and twentyfivefold sectors but these systems may or may not as easily achieve the fractal nature of the preferred proposed system.

A receiver containing one Decoder will resolve a 625 line picture, one with two decoders may choose to resolve 1250 lines with no horizontal enhancement or 625 lines with doubled horizontal enhancement, one with three decoders may choose to resolve 1250 lines with every other line enhanced, one with four decoders can resolve 1250 lines and enhance every line, and so forth up to sixteen decoders (and possibly beyond) resolving a picture equal to a 70 mm motion picture. The preferred proposed HDTV/NTSC system may be considered to be a generic, open ended, fractal system providing various levels of definition while maintaining compatibility at every level.

The transmission of color information in the preferred proposed system has not been discussed because many different schemes may be used without changing the major aspects of the preferred proposed system.

The transmission of digital signals in the sixteenfold or sixtyfourfold variant of the preferred proposed system is a distinct possibility but has not been discussed because, again, many different schemes may be used without changing the major aspects of the preferred proposed system.

The transmission of any type of information including but not limited to visual, auditory, or data in either the parallel signal frame format or the bandwidth reduced serial signal frameless format is obviously possible and the latter format can readily be made compatible with existing transmission systems. These possibilities have not been discussed because they also can be achieved by many different schemes without changing the major aspects of the preferred proposed system.

It must be understood that many modifications may be made by those having ordinary skill in the art to both the method and apparatus of the present invention without departing from the spirit and scope of the invention. Therefore, the presently illustrated embodiments have been shown only by way of example and for the purposes of clarity and should not be taken to limit the scope of the following claims.

I claim:

1. A method for converting an input video signal having a first scan line rate to an output video signal having any desired second scan line rate, said method comprising the steps of:

processing said input video signal having a first serial element format to obtain a first intermediate signal of standardized waveform characteristics;

transforming said first intermediate signal from the said first serial element format to a parallel element format so as to derive a second intermediate signal composed of a sequence of frame periods in the said parallel element format;

holding substantially constant the amplitude of said second intermediate signal during each said derived frame period;

transforming said parallel element format frame sequence signal to one or more simultaneous video output signals each composed of a sequence of frames in a second serial element format, said video output signals derived for each frame sequence period each representing at least a fraction of one decoded scan line;

repeating said frame sequence derivation at a rate related to the desired scan line rate of the output video signal; and combining said decoded scan line fractions into one or more complete video scan lines.

2. The method of claim 1 wherein said step of processing further comprises the steps of:

converting the said input video signal having a first serial element format into digital form as a series of values, said series representative of the elements of consecutive and/or combined video scan lines, said elements of said combined video scan lines rearranged into a fractal scanning pattern from several video scan line inputs; and converting the said series of values into a series of short pulses.

3. The method of claim 1 wherein said step of transforming said first intermediate signal from the said first serial element format to a parallel element format so as to derive a second intermediate signal composed of a sequence of frame periods in the said parallel element format further comprises the steps of:

generating a first sweep frequency waveform of a frequency excursion equal to at least a fraction of the bandwidth of the said input video signal, such that each sweep period of the said first sweep frequency waveform is proportionate to one scan line of the said input video signal;

mixing said first sweep frequency waveform with the said first intermediate signal;

transmitting the result of said mixing through a dispersive delay line with maximum relative dispersion duration equal to two times the duration of the said sweep period of the said first sweep frequency waveform, said relative dispersion duration varying from a relative zero to the said relative maximum over a frequency range of two times the range of the said frequency excursion of the said first sweep frequency waveform;

generating a second sweep frequency waveform of a frequency excursion equal to the said frequency excursion of the said first sweep frequency waveform, such that each sweep period of the said second sweep frequency waveform is proportionate to one scan line of the said input video signal and is synchronized with the output of the said dispersive delay line; and mixing the output of the said dispersive delay line with the said second sweep frequency waveform to derive a signal composed of a sequence of frame periods in a parallel element format, each said frame period composed of the frequency components and time components of the said first intermediate signal, the said frequency components now functions of time expressing at least a portion of the frequency band of the said input video signal over each said frame period, and the said time components now functions of frequency expressing a complete scan line of the said input video signal over a frequency band equal to the frequency excursion of the said first sweep frequency waveform.

4. The method of claim 1 wherein said step of holding substantially constant the amplitude of said second intermediate signal during each said derived frame period further comprises the steps of:

synchronizing the actions of an amplifier/attenuator to said sequence of frame periods;

amplifying or attenuating the amplitude of said intermediate signal so as to maintain a constant amplitude over one said frame period; and repeating said maintenance for each successive said frame period.

5. The method of claim 1 wherein said step of transforming said parallel element format frame sequence signal to one or more simultaneous video output signals each composed of a sequence of frames in a second serial element format, said video output signals derived for each frame sequence period each representing at least a fraction of one decoded scan line, further comprises the steps of:

deriving one or more sampled parallel element format frame sequence signals each composed of a unique subset of the frequency elements of the complete said parallel element format frame sequence signal each said subset of frequency elements evenly spaced throughout the frequency spectrum of said parallel element format frame sequence signal;

generating one or more first sweep frequency waveforms, each said waveform of a frequency excursion equal to at least a fraction of the bandwidth of the said sampled parallel element format frame sequence signal, such that each sweep cycle of each said first sweep frequency waveform is proportionate to one frame of the said sampled parallel element format frame sequence signal;

synchronizing the actions of one or more amplifier/attenuators to each said first sweep frequency waveform;

amplifying or attenuating the amplitudes of each of the said sampled parallel element format frame sequence signals so as to maintain some portion of a (sin x)/x amplitude function over one said sweep cycle of each said first sweep frequency waveform;

repeating each said maintenance for each successive said sweep cycle of each said first sweep frequency waveform;

mixing each said first sweep frequency waveform with its assigned said sampled parallel element format frame sequence signal;

transmitting the result of each said mixing process through its own particular dispersive delay line each said delay line with maximum relative dispersion duration equal to two times the duration of the said sweep period of its assigned said first sweep frequency waveform, said relative dispersion duration varying from a relative zero to the said relative maximum over a frequency range of two times the range of the said frequency excursion of the said assigned first sweep frequency waveform;

generating one or more second sweep frequency waveforms, each said second sweep frequency waveform of a frequency excursion equal to the said frequency excursion of the said first sweep frequency waveform, such that each sweep cycle of each said second sweep frequency waveform is proportionate to one frame of said sampled parallel element format frame sequence signal and is synchronized with the output of a said particular dispersive delay line; and mixing the output of each said dispersive delay line with its appropriate said second sweep frequency waveform.

6. The method of claim 1 wherein said step of combining said decoded scan line fractions into one or more complete video scan lines further comprises the steps of:

converting each of the said decoded scan line fractions into digital form as a series of values, each said series representative of the elements of a unique subset of the complete said parallel element format frame sequence signal;

storing each of the said digital values in its own assigned memory location;

reconstructing each said complete video scan line by reading out the said stored digital values in a predetermined sequence from the said assigned memory locations; and converting the sequence of digital values into an analog output signal.

7. The method of claim 1 wherein said video signal having a first serial element format may also contain non-video information.

8. Apparatus for encoding an input video signal having a first scan line rate into a format suitable for decoding at any desired second scan line rate, said apparatus comprising:

means for processing said input video signal having a first serial element format to obtain a first intermediate signal of standardized waveform characteristics;

means for transforming said first intermediate signal from the said first serial element format to a parallel element format so as to derive a second intermediate signal composed of a sequence of frame periods in the said parallel element format; and means for holding substantially constant the amplitude of said second intermediate signal during each said derived frame period.

9. Apparatus for decoding a video signal encoded by a transformation from a first serial element format to a parallel element format frame sequence signal said apparatus comprising:

means for transforming said parallel element format frame sequence signal to one or more simultaneous video output signals each composed of a sequence of frames in a second serial element format, said video output signals derived for each frame sequence period each representing at least a fraction of one decoded scan line;

means for repeating said frame sequence derivation at a rate related to the desired scan line rate of the output video signal; and means for combining said decoded scan line fractions into one or more complete video scan lines.

10. Apparatus for encoding an input video signal having a first scan line rate into a format suitable for decoding at any desired second scan line rate, said apparatus comprising:

means for processing said input video signal having a first serial element format to obtain a first intermediate signal of standardized waveform characteristics, said standardized waveform characteristics being derived from a precisely timed temporal sampling of the said first serial element format, such that the rate of the said precisely timed temporal sampling is proportionate to the said desired second scan line rate times any desired number of elements per scan line; and analog means for limiting the bandwidth of said first intermediate signal.

11. Apparatus for decoding a video signal having a first serial element format encoded by limiting the bandwidth of a first intermediate signal, said apparatus comprising:

means for transforming said first intermediate signal from the said first serial element format to a parallel element format so as to derive a second intermediate signal composed of a sequence of frame periods in the said parallel element format;

means for holding substantially constant the amplitude of said second intermediate signal during each said derived frame period;

means for transforming said second intermediate signal to one or more simultaneous video output signals each composed of a sequence of frames in a second serial element format, said video output signals derived for each said period each representing at least a fraction of one decoded scan line;

means for repeating said frame sequence derivation at a rate related to the desired scan line rate of the output video signal; and means for combining said decoded scan line fractions into one or more complete video scan lines.

12. The apparatus of claim 8 or 10 wherein said means for processing said input video signal having a first serial element format to obtain a first intermediate signal of standardized waveform characteristics further comprises:

means for converting the said input video signal into digital form as a series of values, said series representative of the elements of consecutive and/or combined video scan lines, said elements of said combined video scan lines rearranged into a fractal scanning pattern from several video scan line inputs; and means for converting the said series of values into a series of short pulses.

13. The apparatus of claim 8 or 11 wherein said means for transforming said first intermediate signal from the said first serial element format to a parallel element format so as to derive a second intermediate signal composed of a sequence of frame periods in the said parallel element format further comprises:

means for generating a first sweep frequency waveform of a frequency excursion equal to at least a fraction of the bandwidth of the said input video signal, such that each sweep cycle of the said first sweep frequency waveform is proportionate to one scan line of the said input video signal;

means for mixing the said first sweep frequency waveform with the said first intermediate signal;

means for transmitting the result of said mixing through a dispersive delay line with maximum relative dispersion duration equal to two times the duration of the said sweep period of the said first sweep frequency waveform, said relative dispersion duration varying from a relative zero to the said relative maximum over a frequency range of two times the range of the said frequency excursion of the said first sweep frequency waveform;

means for generating a second sweep frequency waveform of a frequency excursion equal to the said frequency excursion of the said first sweep frequency waveform, such that each sweep cycle of the said second sweep frequency waveform is proportionate to one scan line of the said input video signal and is synchronized with the output of the said dispersive delay line; and means for mixing the output of the said dispersive delay line with the said second sweep frequency waveform to derive a signal composed of a sequence of frame periods in a parallel element format, each said frame period composed of the frequency components and time components of the said first intermediate signal, the said frequency components now functions of time expressing at least a portion of the frequency band of the said input video signal over each said frame period, and the said time components now functions of frequency expressing a complete scan line of the said input video signal over a frequency band equal to the frequency excursion of the said first sweep frequency waveform.

14. The apparatus of claim 8 or claim 11 wherein said means for holding substantially constant the amplitude of said second intermediate signal during each said derived frame period further comprises:
   means for synchronizing the actions of an amplifier/attenuator to said sequence of frame periods;
   means for amplifying or attenuating the amplitude of said intermediate signal so as to maintain a constant amplitude over one said frame period; and
   means for repeating said maintenance for each successive said frame period.

15. The apparatus of claim 8 or 9 or 10 or 11, wherein said video signal having a first serial element format may also contain non-video information.

16. The apparatus of claim 9 or 11 wherein said step of transforming said parallel element format frame sequence signal to one or more simultaneous video output signals each composed of a sequence of frames in a second serial element format, said video output signals derived for each frame sequence period each representing at least a fraction of one decoded scan line, further comprises:
   means for deriving one or more sampled parallel element format frame sequence signals each composed of a unique subset of the frequency elements of the complete said parallel element frequency waveform.

17. The apparatus of claim 9 or 11 wherein said means for combining said decoded scan line fractions into one or more complete video scan lines further comprises:
   means for converting each of the said decoded scan line fractions into digital form as a series of values, each said series representative of the elements of a unique subset of the complete said parallel element format frame sequence signal;
   means for storing each of the said digital values in its own assigned memory location;
   means for reconstructing each said complete video scan line by reading out the said stored digital values in a predetermined sequence from the said assigned memory locations; and
   means for converting the sequence of digital values into an analog output signal.

* * * * *